United States Patent [19]
Burgess

[11] Patent Number: 5,642,493
[45] Date of Patent: Jun. 24, 1997

[54] METHOD OF LOADING INSTRUCTIONS INTO AN INSTRUCTION CACHE BY REPETITIVELY USING A ROUTINE CONTAINING A MISPREDICTED BRANCH INSTRUCTION

[75] Inventor: Bradley Burgess, Austin, Tex.

[73] Assignee: Motorola, Inc., Schaumburg, Ill.

[21] Appl. No.: 345,043

[22] Filed: Nov. 25, 1994

[51] Int. Cl.⁶ .................................................. G06F 12/06
[52] U.S. Cl. ..................... 395/445; 395/403; 395/421.03; 395/460; 395/584
[58] Field of Search ..................... 395/375, 445, 395/452, 800, 584, 403, 421.03, 460

[56] References Cited

U.S. PATENT DOCUMENTS

| | | | |
|---|---|---|---|
| 5,230,068 | 7/1993 | Van Dyke et al. | 395/375 |
| 5,381,533 | 1/1995 | Peleg et al. | 395/375 |
| 5,421,020 | 5/1995 | Levitan | 395/800 |
| 5,454,117 | 9/1995 | Puziol et al. | 395/800 |
| 5,487,156 | 1/1996 | Popescu et al. | 395/375 |
| 5,511,172 | 4/1996 | Kimura et al. | 395/375 |

*Primary Examiner*—Kenneth S. Kim
*Attorney, Agent, or Firm*—Lee E. Chastain

[57] ABSTRACT

A method of loading a particular block of instructions into the instruction cache (14) of a Harvard architecture data processor (10) involves repetitively mis-predicting a branch instruction in a loop. The branch instruction is conditioned upon an instruction whose execution is contrived to output a sequential fetch address. However, the instruction's result is not available until after the branch instruction begins executing. Therefore, the data processor speculatively executes or predicts the branch instruction. In this case, the branch instruction predicts that it will branch to the particular block of instructions. The data processor then loads the instructions into its instruction cache. Later, the data processor determines that it mis-predicted the branch instruction, returning to the loop for another iteration.

12 Claims, 3 Drawing Sheets

```
       li     r1, 256        #  ⎫
       mtctr  r1             #  ⎬ LOAD NUMBER OF CACHE LINES TO BE PRELOADED
                                ⎭
       li     r1, LOAD-BLOCK #  ⎫
       lis    r1, LOAD-BLOCK #  ⎬ LOAD STARTING ADDRESS OF CACHE LINES
       mtlr   r1             #  ⎭
       li     r3, HID0-VALUE #
       li     r2, 1          #  LOAD NON-ZERO NUMBER INTO r2
       isync  li             #  FINISH ALL PREVIOUS INSTRUCTIONS
       br     loop           # loop:  addi   r1, r1, 32     #  CALCULATE NEXT FETCH ADDRESS
       divw.  r2, r2, r2     #  EXECUTE LONG LADENCY INSTRUCTION WITH CONDITION BIT UPDATE
       beqlr+                #  BRANCH, SPECULATE TAKEN
       mtlr   r1             #  LOAD NEXT FETCH ADDRESS INTO LINK REGISTER
       bdcnz+ loop           #  DECREMENT COUNTER, REENTER LOOP IF NON-ZERO
       mtspr  HID0, r3       #  LOCK CACHE
```

```
        li     r1, 256        # ⎱ LOAD NUMBER OF CACHE LINES TO BE PRELOADED
        mtctr  r1             # ⎰
        li     r1, LOAD-BLOCK # ⎱ LOAD STARTING ADDRESS OF CACHE LINES
        lis    r1, LOAD-BLOCK # ⎰
        mtlr   r1             #
        li     r3, HID0-VALUE #
        li     r2, 1          # LOAD NON-ZERO NUMBER INTO r2
        isync  li             # FINISH ALL PREVIOUS INSTRUCTIONS
        br     loop           # loop:   addi   r1, r1, 32     # CALCULATE NEXT FETCH ADDRESS
        divw.  r2, r2, r2     # EXECUTE LONG LADENCY INSTRUCTION WITH CONDITION BIT UPDATE
        beqlr+                # BRANCH, SPECULATE TAKEN
        mtlr   r1             # LOAD NEXT FETCH ADDRESS INTO LINK REGISTER
        bdcnz+ loop           # DECREMENT COUNTER, REENTER LOOP IF NON-ZERO
        mtspr  HID0, r3       # LOCK CACHE
```

*FIG. 2*

METHOD OF LOADING INSTRUCTIONS INTO AN INSTRUCTION CACHE BY REPETITIVELY USING A ROUTINE CONTAINING A MISPREDICTED BRANCH INSTRUCTION

FIELD OF THE INVENTION

The present invention generally relates to digital computing systems, and more specifically to instruction caches.

BACKGROUND OF THE INVENTION

Memory caches are storage systems incorporated into data processing systems for performance reasons. A memory cache stores a subset of the contents of the data processing system's main memory for use by a selected subsystem, typically the system's data processor. A memory cache can supply data to the data processor faster than the main memory can because of several reasons. First, the memory cache is often made of higher grade memory circuits than is the main memory system. These circuits can simply operate at a higher clock rate than can the main memory. Also, there may be a dedicated bus between the data processor and the memory cache that results in higher bandwidth between the data processor and the memory cache than between the data processor and the main memory. Finally, a memory cache may be physically located on the same integrated circuit as the subsystem to which it provides data. In this case, the memory cache is constructed from faster circuits and there is a dedicated bus between the memory cache and the data processor.

Memory caches may be further differentiated by the type of information which they store. A unified cache stores all types of information in a single structure. An instruction cache only stores instructions that are executed or are to be executed by the data processor. A data cache only stores data that is used or is to be used by the data processor. Data processing systems incorporating an instruction cache and a data cache are referred to as having a "Harvard architecture."

Data processors having a Harvard architecture have at least one disadvantage. These data processors lack the ability to load particular instructions into their instruction caches as they load particular blocks of data into their data caches. Instead, a data processor having a Harvard architecture loads instructions into its instruction cache as a by-product of determining which instruction it should execute next. The data processor loads each of these instructions into its instruction cache immediately before it executes a particular instruction. Consequently, a small delay may be introduced before each instruction or group of instructions is executed while the data processor fetches the instruction from the data processing system's main memory subsystem.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 2 depicts, in tabular form, one sequence of instructions according to the present invention.

DETAILED DESCRIPTION OF A PREFERRED EMBODIMENT

Figure 1:
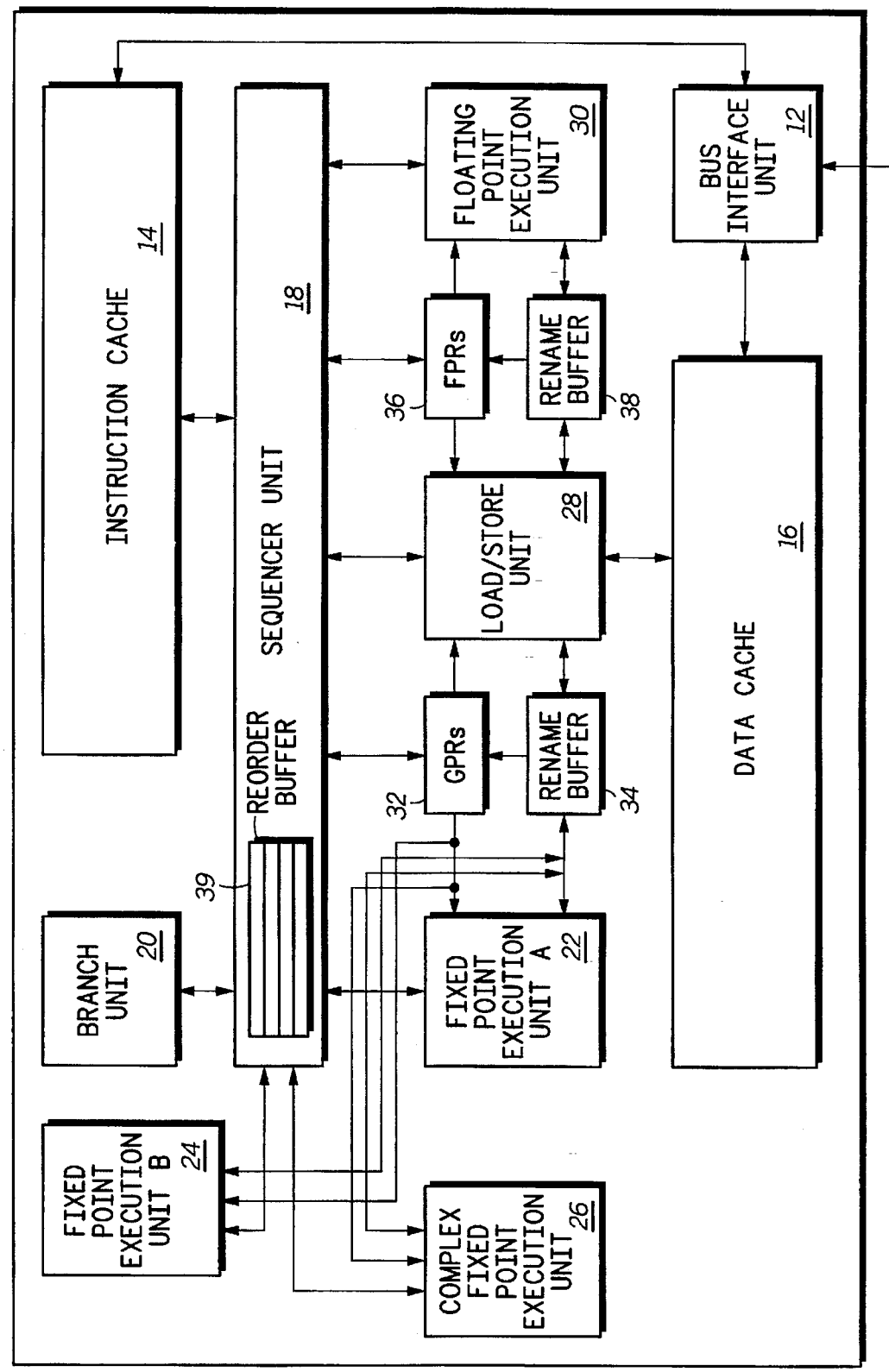
FIG. 1 depicts a block diagram of a data processor for use with the present invention.

FIG. 1 depicts a block diagram of a data processor 10 for use with the present invention. Data processor 10 incorporates separate instruction and data caches. Like other "Harvard architecture" style data processors, data processor 10 loads instructions into its data cache as it determines that it should execute the instructions. Normally, data processor 10 executes the next sequential instruction after completing a particular instruction. Data processor 10 determines the next sequential instruction by adding a displacement to the address of the particular instruction in main memory. In certain circumstances, data processor 10 executes a non-sequential instruction. Data processor 10 executes a non-sequential instruction after it executes branch instructions under certain conditions, after it receives an interrupt, after some instruction generates an exception, etc. According to the present invention, data processor 10 may be programmed to load a block of instructions into its instruction cache before it needs them. Data processor 10 can thereby guarantee that the block of instructions will be present in the instruction cache, for instance, for time critical digital signal processing ("DSP") routines.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 30 and load/store execution unit 28 read and write their results to a floating point architectural register file 36, (labeled FPRs and hereafter FPR file) and to a second rename buffer 38.

The operation of data processor 10 without the disclosed invention is known in the art. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining." In the depicted embodiment, each instruction is broken into as many as five discrete steps: fetch, dispatch, execute, write-back, and completion.

During the fetch phase, memory management circuitry (not shown) within instruction cache 14 retrieves one or more instructions beginning at a memory address (a "fetch address") identified by sequencer unit 18 and branch unit 20. Sequencer unit 18 and branch unit 20 determine what sequence of programmed instructions is appropriate given the contents of certain data registers and the instructions themselves. Instruction cache 14 provides this sequence of programmed instructions to sequencer unit 18. If instruction cache 14 does not contain the required instructions, then it will fetch them from a main memory system external to data processor 10 (not shown).

During the dispatch phase, sequencer unit 18 dispatches the individual instructions of the sequence of programmed instructions to the various execution units 20, 22, 24, 26, 28 and 30. Sequencer unit 18 also reserves an entry in either rename buffer 34 or 38 in which to temporarily store the result, if any, of each instruction. Both rename buffers are first-in-first-out ("FIFO") queues.

During the execute phase, each particular execution unit executes its programmed instruction. Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 maintains a reorder buffer 39 to coordinate this updating. Reorder buffer 39 is a FIFO queue that stores a portion of the programmed instruction stream in its original order. Sequencer unit 18 waits until the oldest instruction in reorder buffer 39 has completed. Then, sequencer unit 18 updates the architectural register with the result stored in the rename buffer entry allocated for the instruction. Sequencer unit 18 also invalidates the instruction's entry in reorder buffer 39 to make room for later instructions. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store execution unit 28 reads data stored in GPR file 32, or FPR file 36 at completion time and writes the selected data to data cache 16. This data may also be written to an external memory system (not depicted) depending upon operating characteristics of data processor 10 not relevant to the disclosed invention. Conversely, load/store execution unit 28 reads data stored in data cache 16 and writes the read data to first rename buffer 34 or second rename buffer 38. If data cache 16 does not contain the required data, then it will fetch it from the main memory system external to data processor 10 via BIU 12.

During the write-back phase, each execution unit writes its result, if any, to the reserved rename buffer entry. Sequencer unit 18 also determines which instructions can update the appropriate architectural registers in the following phase.

During the completion phase, sequencer unit 18 updates the architectural register files with the result of a particular instruction or instructions stored in a rename buffer after every instruction preceding the particular instruction or instructions has so updated the architectural register file.

Generally, each instruction phase takes one machine clock cycle. However, some instructions require more than one clock cycle to execute while others do not require all five phases. There may also be a delay between the write-back and completion phases of a particular instruction due to the range of times which the various instructions take to complete.

The operation of data processor 10 with the disclosed invention is described below in connection with FIGS. 2 and 3.

Data processor 10 also incorporates a static branch prediction methodology to ensure a constant supply of instructions to its various execution units 20, 22, 24, 26, 28 and 30. According to a static branch prediction methodology, if data processor 10 has not yet determined the condition upon which a branch instruction is based, then it assumes either that the branch will be taken or that the branch will not be taken depending upon one or more bits in the branch instruction itself. Data processor 10 then fetches instructions at the taken or not-taken address, as appropriate, before it actually calculates the condition upon which the branch instruction is based. Later, data processor 10 calculates the condition and, if mispredicted, returns to the fetch address not previously selected. Otherwise, data processor continues executing instructions along the predicted path. At program compilation, each branch instruction is predicted as taken or not-taken depending upon the statistical likelihood that the branch is predominantly taken or is predominantly not taken when executed. One or more bits in the instruction itself indicates to data processor 10 whether the branch instruction should be taken or not-taken.

FIG. 2 depicts, in tabular form, one sequence of instructions according to the present invention. The instructions depicted in FIG. 2 perform two functions. First, the instructions load various registers with constants required to preload the desired block of instructions into instruction cache 14. Second, the instructions execute a routine (labeled "loop") which preloads a cache line into instruction cache 14 each time data processor 10 executes the routine "loop." A cache line is a standard size data transfer between data processor 10 and its memory system. The depicted instructions are members of the PowerPC™ instruction set. (PowerPC is a trademark of International Business Machines Corporation.) However, one skilled in the art can, in combination with the instant description, translate the PowerPC instructions into instructions of another data processor.

Continuing with FIG. 2, data processor 10 is initially prepared for execution of the routine "loop." The attribute bits in instruction cache 14 and data cache 16 are modified to allow only the desired instructions to be cached in data processor 10 (not shown). All other address space in main memory is defined to be "non-cacheable." The required number of instruction load operations, N, is stored in a counter register, "ctr." The number of instruction load operations, N, equals the number of instructions to be preloaded into instruction cache 14 divided by the size of a standard memory access. Data processor 10 then executes the routine "loop" N times. In the depicted example, the number of thirty-two bit instructions to be so preloaded is 2,048, a standard size of a memory access is thirty-two bytes, and N equals two hundred and fifty-six. The address of the first instruction to be preloaded, LOAD_BLOCK, is stored into a link register, "lr." The link register functions as a pointer to the next instruction to fetch from main memory.

Next, a constant that will lock instruction cache 14 against further loads is stored in general purpose register r3. The constant HID0_VALUE is ultimately moved to a special purpose register HID0 where it guards all instruction cache operations after the routine "loop" is executed N times. The general purpose register r2 is loaded with a non-zero value. Finally, all instructions are allowed to complete before branching to the routine "loop" through the use of an instruction synchronization operation.

Data processor 10 executes the routine "loop" N times, thereby preloading N cache lines into instruction cache 14. Data processor 10 calculates the address of the next instruction load operation by adding the standard size of a memory access in bytes to the present instruction pointer in each of the N times that it executes the depicted routine. Data processor 10 then executes a long latency instruction whose result is the basis of a subsequent branch instruction. In this case, the branch instruction will branch to the contents of the link register (the pointer) if the result of the long latency instruction is equal to zero. Otherwise, the branch instruction will output the sequential fetch address.

The long latency instruction, an integer divide instruction, completes after the branch instruction begins and its result is always true or non-zero. The branch instruction is coded to statically predict that it should be taken ("+") if the condition upon which it is based is not known. By construction, the result of the long latency instruction is never known before the branch instruction is executed. Therefore, data processor 10 always preloads the eight instructions indexed by the contents of the link register.

Eventually, data processor 10 completes the long latency instruction and determines that it should not have branched to the contents of the link register. Data processor 10 then continues executing instructions at the instruction immediately following the branch instruction. Here, a move-to instruction follows the mis-predicted branch instruction. The move-to instruction loads the next pointer value into the link register. Finally, data processor 10 decrements the contents of the condition register, compares the value to zero, and returns to the beginning of the routine "loop" if it has executed the routine less than N times. Data processor 10 falls out of the routine "loop" after executing the routine N times.

After executing the routine "loop" N times, data processor 10 locks instruction cache 14 to prevent the preloaded instructions from being inadvertently overwritten. Then, the attribute bits in data cache 16 may be modified to allow new data to be cached in data cache 16 (not shown).

Figure 3:
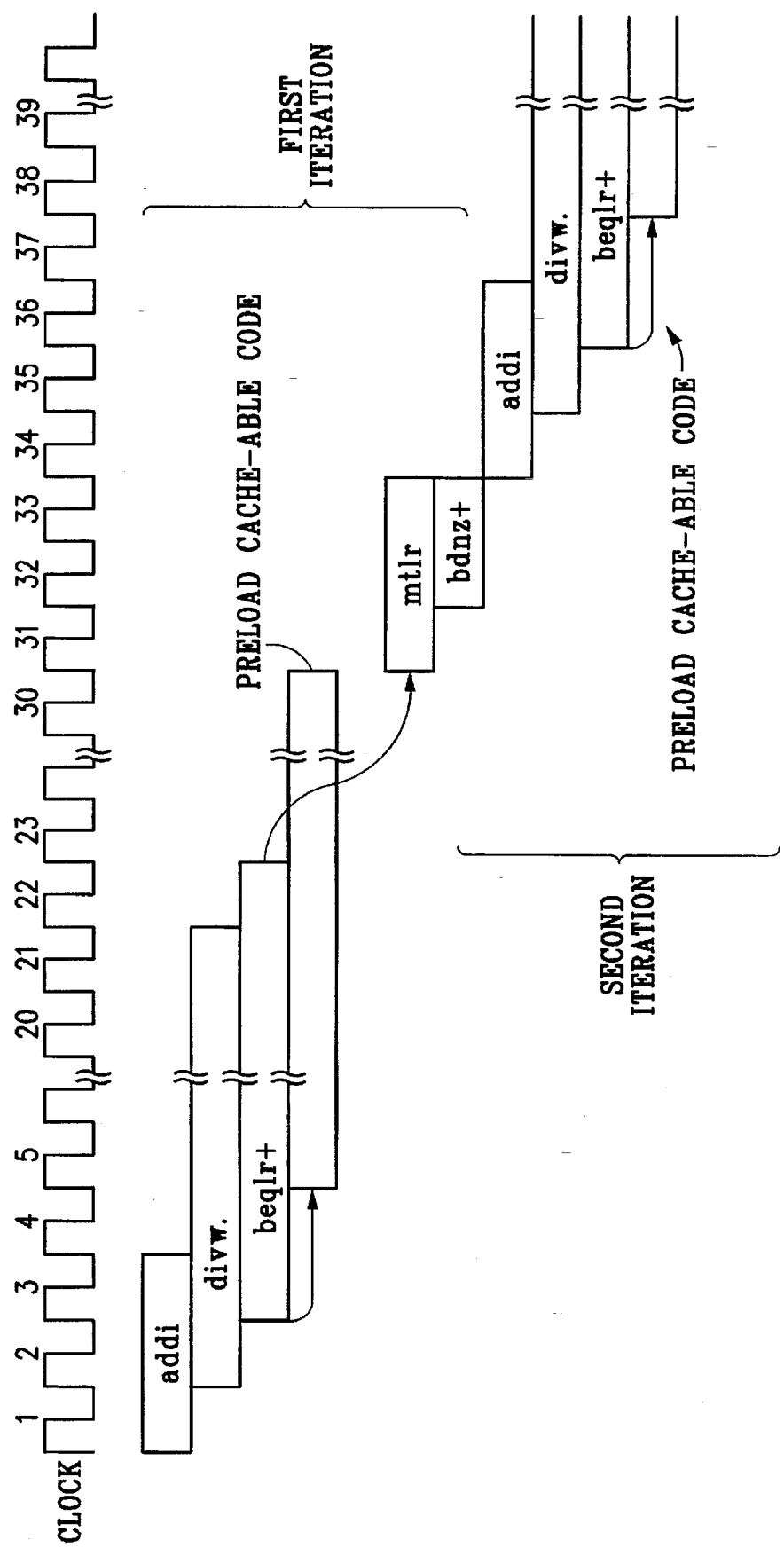
FIG. 3 depicts a first timing diagram of the data processor depicted in FIG. 1 executing a portion of the sequence of instructions depicted in FIG. 2.

FIG. 3 depicts a first timing diagram of data processor 10 depicted in FIG. 1 executing a portion of the sequence of instructions depicted in FIG. 2. FIG. 3 depicts two iterations of the routine "loop" relative to a periodic clock signal CLOCK. As described above, the long latency divide instruction, divw., finishes after the beginning of the subsequent branch instruction, beqlr+. In the depicted embodiment, data processor 10 may require twenty or more cycles to execute an integer divide instruction. However, in the fifth clock cycle, data processor 10 speculatively branches and begins preloading instructions indexed by the contents of the link register. The branch instruction beqlr+ will ultimately generate a corrected fetch address in the clock cycle following the completion of the long latency instruction. Data processor 10 will then execute the move-to instruction and the second branch instruction as soon as instruction cache 14 finishes preloading the cache line. Certain embodiments of data processor 10 will execute the preloaded instructions as soon as they are received. Hence, FIG. 3 depicts a vertical break between the preload cache line operation and the move-to instruction where these preloaded instructions would execute. These same data processors, however, will not commit the results of speculatively fetched instructions to the various architectural registers until the branch instruction beqlr+ completes as predicted.

Although the present invention has been described with reference to a specific embodiment, further modifications and improvements will occur to those skilled in the art. For instance, the disclosed invention may be incorporated into data processors traditionally classified as complex instruction set computers ("CISC") and may be incorporated into data processors able to dispatch two or more instructions per clock cycle. Also, the disclosed invention may be practiced using dynamic branch prediction methodologies in place of the described static branch prediction methodology. As an example, the PowerPC 620™ microprocessor is able to dynamically predict branch instructions while selectively updating its branch history table. (PowerPC 620 is a trademark of International Business Machines Corporation.) Such a methodology will result in a fixed prediction if the branch history table is not revised to reflect incorrect guesses. It is to be understood therefore, that the invention encompasses all such modifications that do not depart from the spirit and scope of the invention as defined in the appended claims.

I claim:

1. A method of loading instructions into an instruction cache of a data processor by repetitively using a routine containing a branch instruction having a desired instruction as its mispredicted target, the routine comprising the steps of:

incrementing a pointer, a value of the pointer indexing one of the instructions;

executing a long latency instruction generating a predetermined result comprising a first value; and speculatively executing a branch instruction before the long latency instruction completes, the branch instruction generating a fetch address conditioned on the result, the branch instruction generating a sequential-fetch-address conditioned on the first value of the result, the branch instruction generating a branch-taken-fetch-address conditioned on a second value of the result and responsive to the pointer, the branch instruction generating the branch-taken-fetch-address while the result is unknown, the data processor loading into an instruction cache instructions at the sequential-fetch-address or branch-taken-fetch address, as the case maybe, for execution.

2. The method of claim 1 further comprising the step of locking the instruction cache after executing the routine.

3. The method of claim 2 wherein the routine further comprises the step of:

comparing a value of a counter to a preset value; and executing the routine responsive to the step of comparing.

4. The method of claim 2 wherein the routine further comprises the step of:

comparing the pointer to a preset value; and executing the routine responsive to the step of comparing.

5. The method of claim 1 wherein the routine further comprises the step of:

comparing a value of a counter to a preset value; and executing the routine responsive to the step of comparing.

6. The method of claim 1 wherein the routine further comprises the step of:

comparing the pointer to a preset value; and executing the routine responsive to the step of comparing.

7. A method of loading instructions into an instruction cache of a data processor by repetitively executing a branch instruction having a desired instruction as its mispredicted target, the method repetitively executing a routine, the routine comprising the steps of:

generating a first branch-taken-fetch-address indexing a first instruction of the instructions;

first fetching a first instruction in a data processor, the first instruction generating a predetermined result when executed, the first predetermined result equal to a first value;

second fetching a branch instruction in the data processor, the branch instruction generating a sequential-fetch-address if the result equals the first value, the branch instruction generating the first branch-taken-fetch-address if the result equals a second value, the branch instruction speculatively generating the first branch-taken-fetch-address if the result is unknown, the data processor loading instructions into the instruction cache at the sequential-fetch-address or first-branch-taken-fetch address, as the case maybe, for execution;

first loading instructions into an instruction cache of the data processor responsive to the branch instruction speculatively generating the first branch-taken-fetch-address because the result is unknown;

first executing the first instruction, the first instruction generating the first value as the result;

second executing the branch instruction, the branch instruction generating the sequential-fetch-address because the result equals the first value;

generating a second branch-taken-fetch-address indexing a second instruction of the instructions;

third fetching the first instruction;

fourth fetching the branch instruction;

second loading instructions into the instruction cache responsive to the branch instruction speculatively generating the second branch-taken-fetch-address because the result is unknown;

third executing the first instruction, the first instruction generating the first value as the result; and fourth executing the branch instruction, the branch instruction generating the sequential-fetch-address because the result equals the first value.

8. The method of claim 7 further comprising the step of locking the instruction cache after executing the routine.

9. The method of claim 8 wherein the routine further comprises the step of:

comparing a value of a counter to a preset value; and executing the routine responsive to the step of comparing.

10. The method of claim 8 wherein the routine further comprises the step of:

comparing a pointer to a preset value; and executing the routine responsive to the step of comparing.

11. The method of claim 7 wherein the routine further comprises the step of:

comparing a value of a counter to a preset value; and executing the routine responsive to the step of comparing.

12. The method of claim 7 wherein the routine further comprises the step of:

comparing a pointer to a preset value; and executing the routine responsive to the step of comparing.

\* \* \* \* \*